United States Patent
Buettner

(10) Patent No.: US 8,454,389 B2
(45) Date of Patent: Jun. 4, 2013

(54) FUSE-RECEIVING DEVICE

(75) Inventor: Alex Buettner, Roedental (DE)

(73) Assignee: Woehner GmbH & Co. KG Elektrotechnische Systeme, Roedental (DE)

( * ) Notice: Subject to any disclaimer, the term of this patent is extended or adjusted under 35 U.S.C. 154(b) by 6 days.

(21) Appl. No.: 13/101,404

(22) Filed: May 5, 2011

(65) Prior Publication Data

US 2011/0275237 A1 Nov. 10, 2011

(30) Foreign Application Priority Data

May 6, 2010 (DE) .......... 10 2010 028 679

(51) Int. Cl.
*H01R 13/66* (2006.01)

(52) U.S. Cl.
USPC .................................... 439/620.26

(58) Field of Classification Search
USPC .......... 439/366, 76.2, 354, 620.26, 620.29; 361/760, 760.71; 337/227, 205; 174/50, 58
See application file for complete search history.

(56) References Cited

U.S. PATENT DOCUMENTS

| | | | | |
|---|---|---|---|---|
| 3,813,626 A | * | 5/1974 | Cetola et al. | 337/245 |
| 4,013,989 A | * | 3/1977 | Born | 337/227 |
| 4,126,368 A | * | 11/1978 | Godfrey et al. | 439/354 |
| 4,128,024 A | * | 12/1978 | Hyams et al. | 81/3.8 |
| 4,841,413 A | * | 6/1989 | Mizerak | 361/760 |
| 5,434,376 A | * | 7/1995 | Hyatt et al. | 200/293 |
| 6,031,446 A | * | 2/2000 | Prohaska et al. | 337/215 |
| 6,587,028 B2 | * | 7/2003 | Mollet et al. | 337/194 |
| 6,666,722 B2 | * | 12/2003 | Fukumori et al. | 439/620.26 |
| 6,753,754 B1 | * | 6/2004 | Black et al. | 337/215 |
| 6,784,783 B2 | * | 8/2004 | Scoggin et al. | 337/194 |
| 6,875,028 B2 | * | 4/2005 | Kita et al. | 439/76.2 |
| 7,012,498 B2 | * | 3/2006 | Van Heerden | 337/286 |
| 7,095,628 B2 | * | 8/2006 | Friedrich et al. | 361/833 |
| 7,118,390 B2 | * | 10/2006 | Kita | 439/76.2 |

(Continued)

FOREIGN PATENT DOCUMENTS

| | | |
|---|---|---|
| DE | 4329428 C1 | 1/1995 |
| EP | 1109192 A2 | 6/2001 |
| EP | 1251537 A2 | 10/2002 |
| WO | 2004/073127 A1 | 8/2004 |

OTHER PUBLICATIONS

Extended European Search Report for European Application No. 11 164 514-9, dated May 22, 2012, 6 total pages.

*Primary Examiner* — Alexander Gilman
(74) *Attorney, Agent, or Firm* — Westman, Champlin & Kelly, P.A.

(57) ABSTRACT

The invention relates to a fuse-receiving device, in particular for junction boxes in photovoltaic systems, comprising a fastening web and receiving contact portions, arranged on the end faces of the fastening web, for contact blades of fuses, comprising insulating caps which are placed on the fastening web and cover the receiving contact portions at least in part and also have slot openings which allow the contact blades of a fuse to be guided through, the fastening web having at least one groove-shaped socket for an electrical busbar, into which socket a contact tab of one of the receiving contact portions is inserted, and at least one groove which extends along the axis of the fastening web being provided in at least one end face of the fastening web, and a holding member being provided which has a plug means which may be brought into engagement with the at least one groove.

15 Claims, 5 Drawing Sheets

U.S. PATENT DOCUMENTS

| | | | |
|---|---|---|---|
| 7,189,082 B2 * | 3/2007 | Fukushima et al. | 439/76.2 |
| 7,217,162 B2 * | 5/2007 | Harada et al. | 439/857 |
| 7,333,337 B2 * | 2/2008 | Kita | 361/710 |
| 7,566,230 B2 * | 7/2009 | Ozawa et al. | 439/76.2 |
| 7,932,804 B2 * | 4/2011 | Buettner | 337/196 |
| 7,982,578 B2 * | 7/2011 | Buettner | 337/196 |

\* cited by examiner

FUSE-RECEIVING DEVICE

CROSS-REFERENCE TO RELATED APPLICATION

This Application claims the benefit of German Patent Application No. 10 2010 028 679.6, filed May 6, 2010, the contents of which are hereby incorporated by reference in their entirety.

TECHNICAL BACKGROUND

The invention relates to a fuse-receiving device, in particular for junction boxes in photovoltaic systems.

A fuse-receiving device of the type mentioned at the outset has a fastening web, on the end faces of which receiving contact portions are provided for receiving contact blades of fuses. At the end faces thereof, fuse-receiving devices of this type comprise insulating caps, within which the receiving contact portions are arranged and which contain the slot openings allowing the contact blades of the fuse links in question to be guided through. In fuse-receiving devices of this type which, with the exception of the receiving contact portions, consist of plastics material, the fastening web is fastened to covering metal plates in the junction box. In this arrangement, one terminal of the fuse-receiving device is placed directly on an electrical busbar and is screwed thereto, while the other terminal is in each case connected to a line which is guided through an external component such as a transducer, the transducer being used to measure the current supplied. In this arrangement, the electrical busbar is located outside the fuse-receiving device.

An object of the invention is to produce a fuse-receiving device which enables a compact arrangement to be achieved, for example in a junction box, and secondly allows a transducer to be accommodated.

SUMMARY OF THE INVENTION

The object is achieved according to the invention in a fuse-receiving device, in particular for junction boxes in photovoltaic systems, in which the fuse-receiving device contains a fastening web and receiving contact portions, arranged on the end faces of the fastening web, for contact blades of fuses, the receiving contact portions being inserted into insulating caps which have slot openings allowing the contact blades to be guided through, in that the fastening web has at least one groove-shaped socket for an electrical busbar, into which socket a contact tab of one of the receiving contact portions is inserted, and in that at least one groove extending along the axis of the fastening web is provided in at least one end face of the fastening web, and in that a holding member is provided which has a plug means which may be brought into engagement with the at least one groove.

In a possible embodiment the plug means is formed by tabs projecting away from the holding member.

According to a further embodiment, it is provided that, when engaged with the fastening web, the holding member is arranged substantially in the plane of the fastening web.

In a possible embodiment a contact tab which projects beyond the fastening web is provided on the side of the fastening web facing the holding member.

In accordance with a further embodiment, it is proposed that the contact tab projecting from the fastening web has an opening.

According to a possible embodiment, it is provided that the holding member is provided with a fastening means for receiving screw means or the like.

A further embodiment is characterised in that the holding member has, as a fastening means, a nut which is inserted into a fastening block and is used to receive screw means which are guided through the opening in the contact tab.

In accordance with a further embodiment, it is proposed that the holding member has further fastening means.

According to a possible embodiment, it is provided that a component, preferably a transducer, is arranged on the holding member and is secured relative to a base plate of the holding member by the fastening means.

In accordance with a further embodiment, it is provided that the fastening web is provided with a plug socket formed to receive the plug means.

According to a further embodiment, it is proposed that the contact tab projecting from the fastening web is arranged so as to be substantially perpendicular and at a distance from the plane of the electrical busbar and is electrically connected to one of the receiving contact portions.

In a further embodiment the groove for receiving the electrical busbar is oriented transversely to the longitudinal axis of the fastening web.

According to a possible embodiment, it is provided that the contact tab inserted into the groove is approximately Z-shaped and is electrically connected to both a contact portion and the electrical busbar.

The invention makes it possible for the fuse-receiving device to be arranged remarkably compactly within a junction box, a plurality of fuse-receiving devices of this type conventionally being arranged in parallel side by side, since the electrical busbar is placed over the respective fastening web in the vicinity of the relevant terminal and the electrical busbar or busbar lies within the length of the fuse-receiving device. Provided on the output side of the fuse-receiving device is a holding member which can be detached from the fastening web and receives a transducer which, when the fastening web and the holding member are engaged, is rigidly arranged relative to the fuse-receiving device and the fuse inserted therein.

In a possible embodiment of the fuse-receiving device according to the invention, a contact tab, which is electrically conductively connected to the associated receiving contact portion closest thereto, is located on an end face of and parallel to the fastening web. The contact tab projects beyond the fastening web and, when the holding member is brought into engagement with the fuse-receiving device, is displaced through the transducer as the holding member is simultaneously attached to the fastening web. The free end of the contact tab is preferably provided with a hole which is brought into alignment with a nut located in the holding member, so that once the holding member has been attached to the fastening web of the fuse-receiving device by means of a screw, the contact tab may be rigidly connected to the relevant nut of the holding member, which simultaneously ensures that the holding member is rigidly arranged relative to the fastening web.

The insulating caps located above the receiving contact portions are preferably provided so as to be removable from the fastening web and are rigidly arranged on the fastening web by being clipped with a locking means. In this way the receiving contact portions are protected against external accidental contact.

BRIEF DESCRIPTION OF FIGURES

An embodiment of the fuse-receiving device according to the invention will be described below in order to explain further features. In the drawings.

DETAILED DESCRIPTION OF EMBODIMENT

With reference to FIG. 1 to 5, a preferred embodiment of a fuse-receiving device which is suitable in particular for junction boxes in photovoltaic systems will be described below. Pairs or a plurality of fuse-receiving devices of this type are provided in parallel side by side, with one end face thereof connected to an electrical busbar while the other end face leads, via a connecting cable, to an electric power generator or is attached to what is known as an array junction box (AJB).

Figure 1:
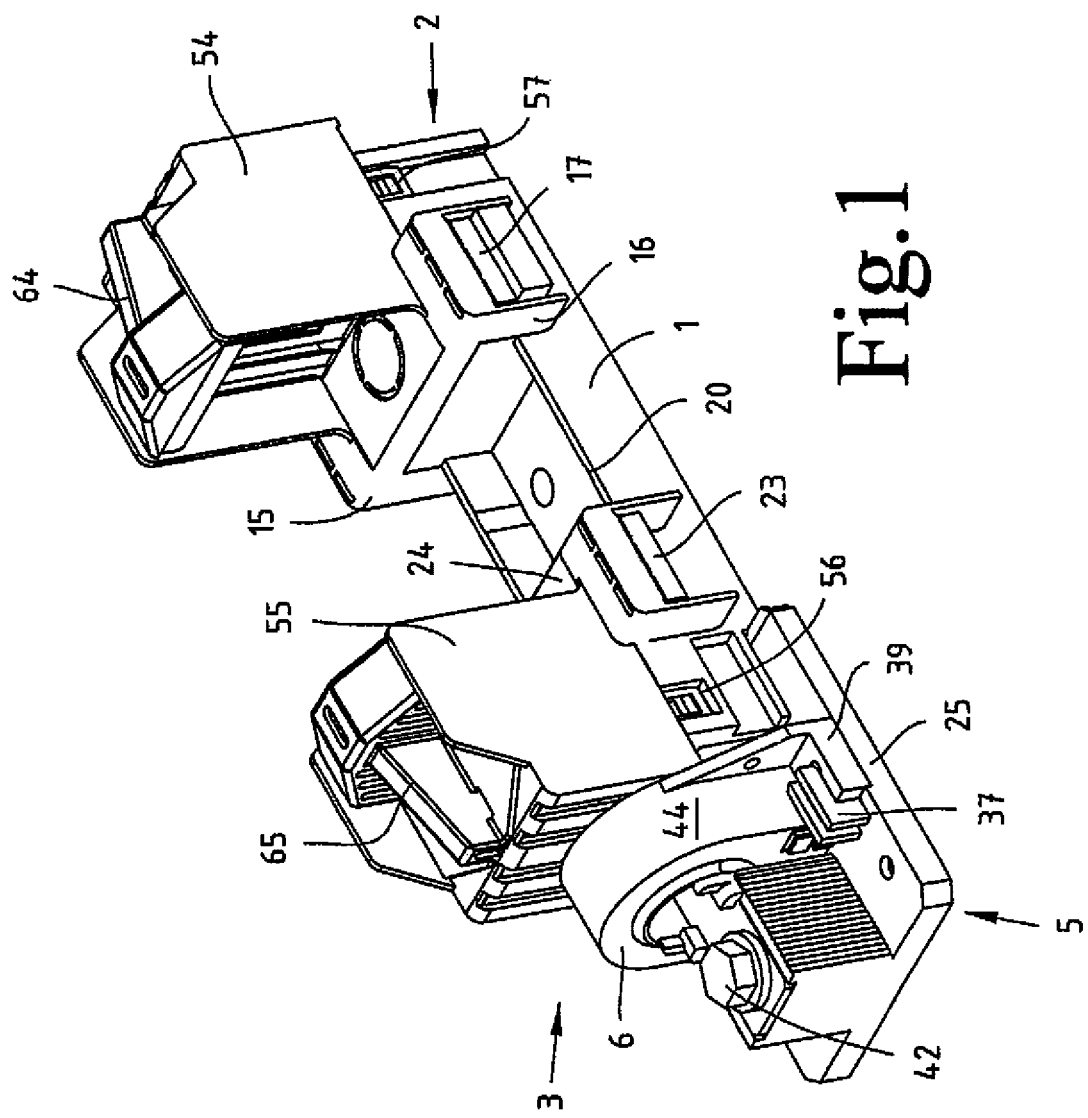
FIG. 1: is a perspective view of a fuse-receiving device according to an embodiment of the present invention.

The fuse-receiving device according to an embodiment of the present invention comprises a fastening web 1, on the end faces 2, 3 of which receiving contact portions (described further below) are formed which are used to receive contact blades of a fuse link which is not shown in the figures. Shown on the left-hand side of FIG. 1 is a holding member 5, which is preferably used to hold an electrical or electronic component, for example in the form of a transducer 6. The holding member 5 is laterally attached to the fastening web 1, that is to say it is provided in the longitudinal direction of the axis of the fastening web 1 and is rigidly connected to the fastening web 1 in a manner that will be described below.

Figure 2:
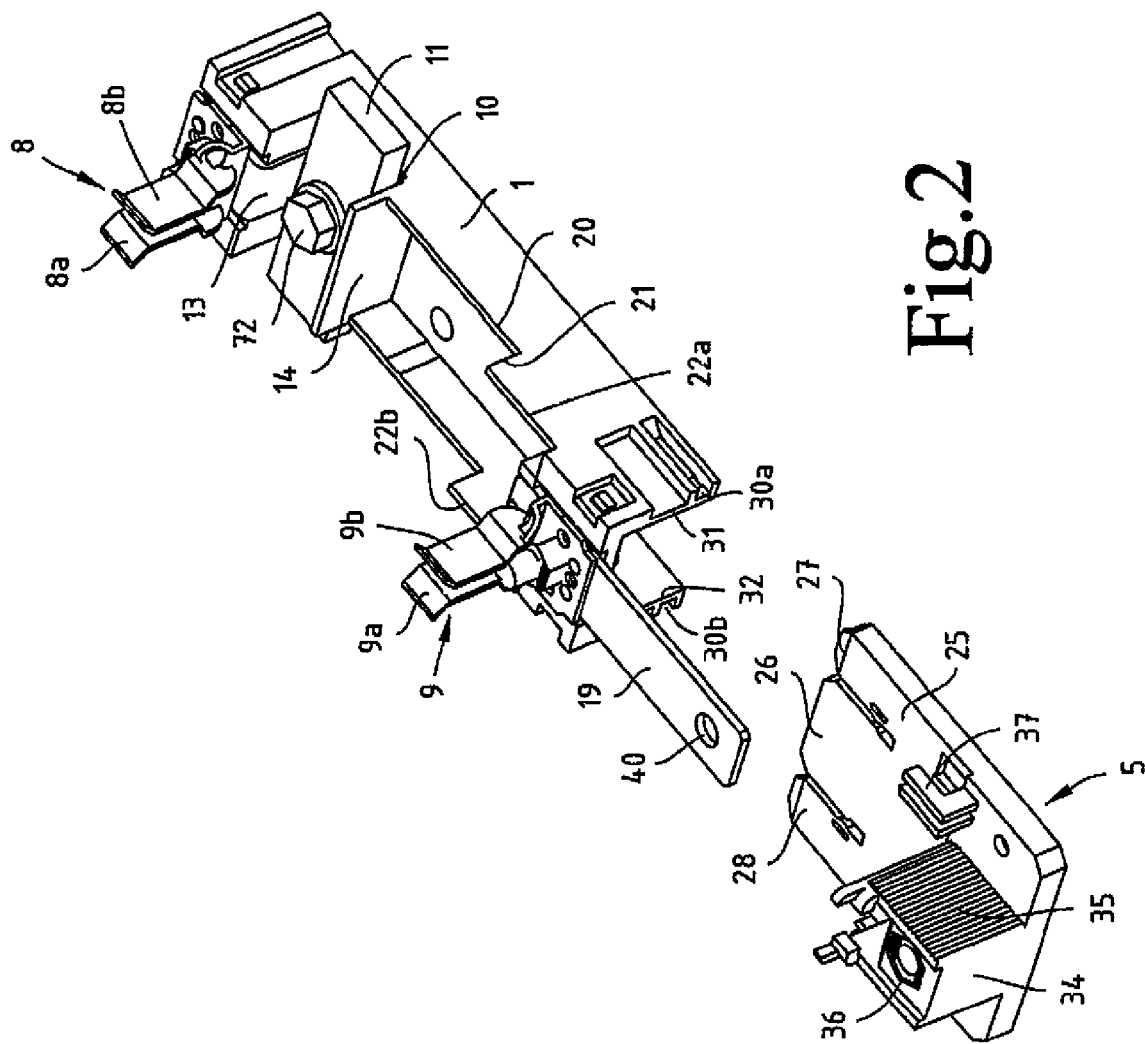
FIG. 2: is a perspective view of the fuse-receiving device, the holding member being removed from the fastening web and the insulating caps and a transducer being removed for clarification of the construction of the fuse-receiving device according to the invention.

As shown by FIG. 2, receiving contact portions 8, 9, preferably in the form of lyre-shaped contacts which are used to receive contact blades of conventional fuses, are provided on the end faces of the fastening web 1. Conventional fuses, which are to be used in this arrangement, are provided with a blade contact at each end face in such a way that, when the fuses are inserted into the fuse-receiving device according to the invention, the contact blades are inserted between the individual contacts denoted by reference numerals 8a, 8b and 9a, 9b.

According to FIG. 1, a groove 10, which extends transversely to the axial direction of the fastening web 1 and is used to receive an electrical busbar 11, is formed in the fastening web 1, the electrical busbar or electrical bus 11 being guided away via a plurality of fuse-receiving devices arranged parallel to one another, and therefore being provided as a common electrical bus.

A preferably Z-shaped contact tab 13 which is provided between the electrical busbar 11 and the receiving contact portion 8 is used to contact the electrical busbar 11. In the preferred embodiment shown, the groove 10 is laterally defined by a transverse wall 14. A cap 15 (FIG. 1) is used to cover the electrical busbar 11 with respect to the fuse-receiving device shown, said cap, via the feet 16 thereof, overlapping, at least in part, the transverse wall 14 and the electrical busbar 11 and being laterally provided with a compensating web 17 which can be broken off in the event that a thicker electrical busbar 11 is used or two electrical busbars arranged one on top of the other are used.

In photovoltaic systems on a larger scale with a correspondingly greater number of fuse-receiving devices, two electrical busbars resting one on top of the other may also be provided instead of a single electrical busbar 11, for which purpose the compensating web 17 (only shown in relation to the cap 15 in FIG. 3) located on the cap 15 and 24 and integrally moulded on the end wall of the cap 15 can be broken off. As the figures show, the compensating web 17 is perpendicular to the axis of the cap 15 and 24. Viewed in cross-section as a whole, the cap 15 and 24 is approximately U-shaped and has a lateral cut-out 75 which makes it possible to place the cap 15 and 24 on the fastening web 1. The feet arranged so as to laterally overlap the fastening web 1 are denoted by reference numerals 15a, 15b in FIG. 3.

Provided on the side opposite the receiving contact portion 8 is the receiving contact portion which is denoted by reference numeral 9 and also has two contacts 9a, 9b extending largely parallel to one another. Said receiving contact portion 9 contains a contact tab 19 which projects from the end face 3 of the fastening web 1 and has a predetermined length, as described further below. The contact tab 19 extends transversely to the electrical busbar 11 at a predetermined distance from the lower edge of the fastening web 1.

In addition to the groove 10, the fastening web 1 has a further groove 20 which follows a step 21 adjoined by the web portions 22a, 22b which extend parallel to one another. The web portions 22a, 22b lie above the groove 10 and optionally receive an electrical busbar 23 which is covered by a cap 24, as described in relation to the cap 15 and shown in FIG. 1. This embodiment allows the fuse-receiving device to be used in a variable manner, since it is possible to arrange electrical busbars at the two end faces, optionally also without a contact tab 19 and without a holding member 5. In principle, the fuse-receiving device according to the invention may therefore also be used without a holding member 5—in this case the electrical busbar may be inserted alternatively at one of the two end faces of the fuse-receiving device. Furthermore, instead of only one electrical busbar 11, as shown in FIGS. 1 and 2, it is possible to provide two electrical busbars of this type one on top of the other or also one electrical busbar of twice the thickness, it being necessary in the latter case to break off the compensation web 17 of the cap 15.

According to FIGS. 1 and 2, the holding member 5 has a base plate 25 on which fastening tabs 26, 27, 28 are formed for sliding into correspondingly formed grooves on the fastening web 1. In the embodiment shown, the fastening tabs 27, 28 are provided to be inserted into lateral grooves 30 on the fastening web 1, while the central fastening tab 26 is slid between the walls, denoted by reference numerals 31 and 32, of the fastening web 1. The fastening tabs 27, 28 lie approximately in the plane defined by the base plate 25 and project from the base plate 25 towards the fastening web 1.

As shown by the illustrations in FIGS. 1 and 2, in a preferred embodiment only one electrical busbar 11 is provided as a connection between identical terminals of a plurality of fuse-receiving devices, whereas a cable connection is formed on the opposite side, for example if a transducer is used on the holding member 5.

On the plate 25 thereof, the holding member 25 has a fastening means 34, preferably a fastening block 34, which projects upwards and, according to a preferred configuration, is furrowed laterally, as shown by the furrowed face 35 in FIG. 2, so that the holding member 5 can be easily pushed towards and pulled away from the fastening web 1 with a person's fingers. A screw nut 36 is located in the fastening block 34 where it is vertically aligned with the plate 25. In addition, stops or limiting members 37 are formed on the base plate 25.

The screw nut 36 rests with a positive fit in the fastening block 34, which projects upwards from the base 25 and is provided with a preferably many-sided recess which receives the screw nut 36.

FIG. 1 shows the holding member 5 together with a transducer 6 which is slid onto the base 25 in such a way that the feet 39 thereof are displaced under the stop or limiting members 37 and said holding member is retained rigidly relative to the base 25 by the stop or limiting members 37. Once the holding member 5 is displaced in accordance with FIG. 1 towards the fastening web 1 so as to engage therewith, the feet 39 of the transducer 6 are engaged with the stop or limiting members 37, which are approximately L-shaped and oriented towards the fastening web 1 as shown in FIGS. 1 and 2. In addition, in the arrangement shown in FIG. 1, the contact tab 19 is guided through the transducer 6, specifically to the extent that the hole denoted by reference numeral 40 is aligned with the screw nut 36 and the contact tab 19 is fastened to the fastening block 34 by a screw or a stud bolt 42 being screwed into the nut 36. In the embodiment shown, the screw or stud bolt 42 is used not only to fasten the retaining tab 19 to the fastening means 34, but preferably also simultaneously fastens a contact ring which is connected to a cable (not shown in greater detail in the figures) which leads from an electric power generator or photovoltaic modules. In this case the contact tab 19 is used as an input for the fuse-receiving device according to the invention, the current received via the contact tabs 19 being detected by the transducer 6 surrounding the contact tab 19, and the current value measured being supplied to a measurement station or the like by a cable leading away from the transducer.

Figure 3:
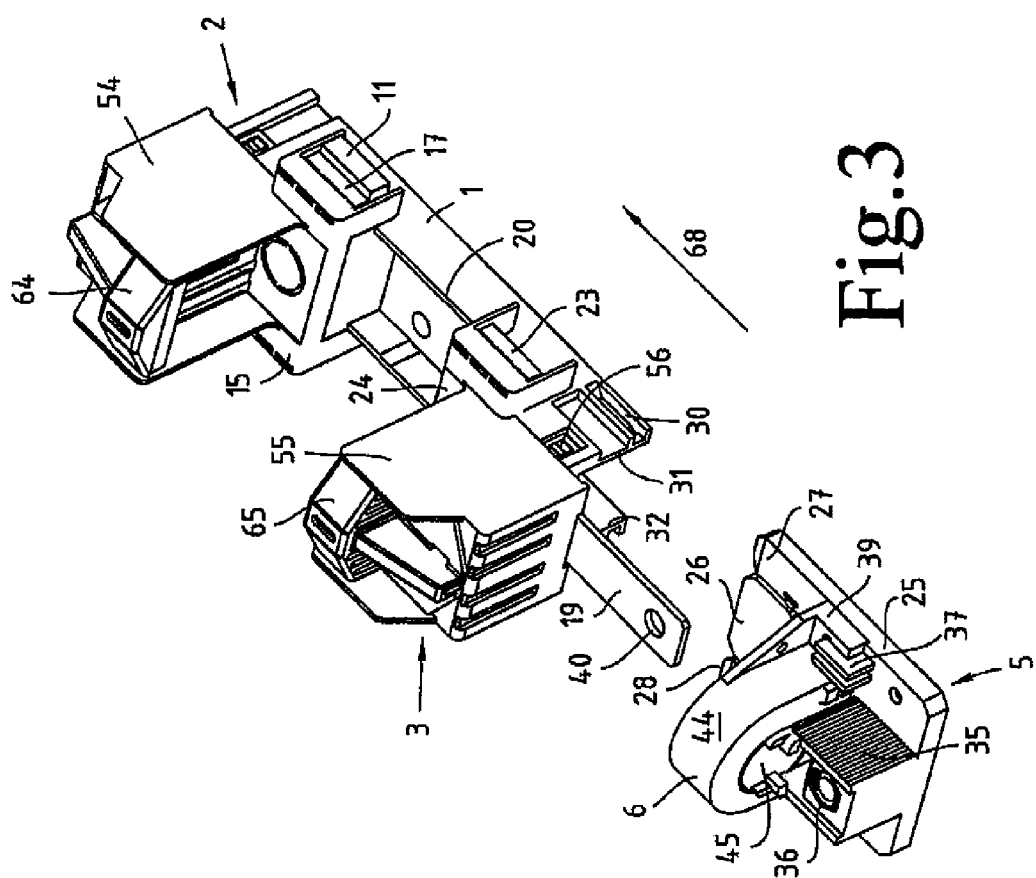
FIG. 3: is a view corresponding to that of FIG. 1, illustrating certain details.

FIG. 3 is an illustration corresponding to FIG. 1 in which the holding member 5 is not engaged with the fastening web 1. The same reference numerals in FIG. 3 denote the same parts as described in FIGS. 1 and 2.

Figure 4:
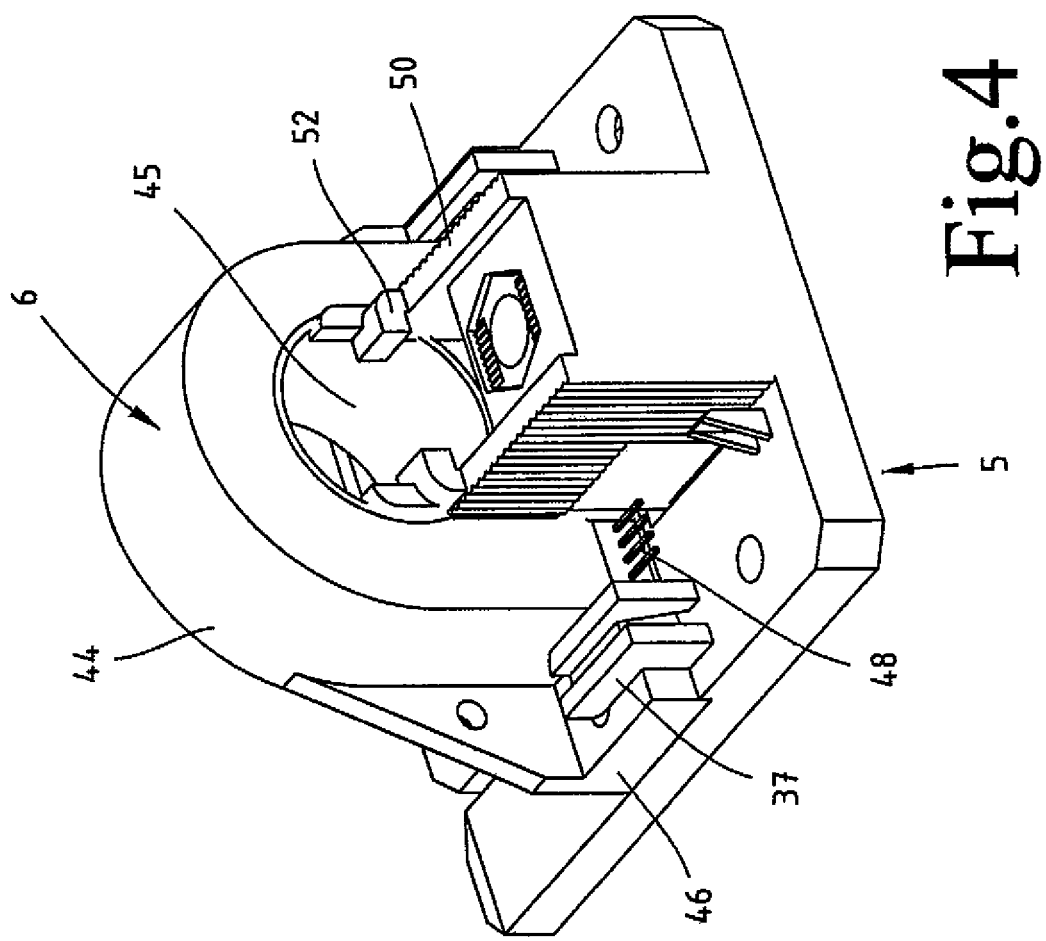
FIG. 4: is a rear view of the holding member.

FIG. 4 is a rear view of the holding member according to the invention, together with the transducer 6 placed thereon. As mentioned above, instead of a transducer 6, a different electronic component placed on the holding member 5 may also be used. The embodiment shown in FIG. 4 contains a holding member 5 comprising a transducer 6 which is provided in a housing 44 with a circular cavity 45, the housing 44 having lateral legs 46 which are used for fastening purposes with the aid of the stop or limiting members 37, the legs 46 being substantially L-shaped and corresponding to the shape of stop or limiting members 37. Located on the rear of the housing 44 are terminal contacts which are generally denoted by reference numeral 48 and are used to connect a cable. These terminals 48 are used to receive a plug with a line which lies on the base plate 25 via a cable grip 49.

Located above the fastening block 34 is a guide matrix 50 and optional additional guide projections 52 which are used to guide the contact tab 19 exactly and also to retain it as the holding member 5 is slid onto the fastening web 1. The guide matrix 50 may consist either of legs which project perpendicularly from the fastening block 34 or of L-shaped guides.

It is evident from FIG. 1 to 3 that the receiving contact portions 8, 9 are largely closed and insulated by caps 54, 55 which are clipped onto the fastening web 1. For this purpose, the caps 54, 55 have tabs 56, 57 which project laterally and downwards and lock with locking teeth 58, 59 projecting from the fastening tab 1. As can be seen from FIG. 5, the caps 54, 55 are provided with slot openings 61, 62, through which the contact blades of the respective fuses, together with the fuse, are inserted in order to enter into electrical contact with the receiving contact portions 8, 9. Once the fuses have been inserted, the caps 54, 55 are optionally closed from above by additional hoods 64, 65 so the fuses and the contact blades thereof are covered against accidental contact. To remove a fuse, it is therefore necessary to lift the hoods 64, 65 from the caps 54, 55, after which the respective fuse may be removed if necessary.

The caps 54, 55 preferably have a width which corresponds to the width of the fastening web 1 and is smaller than the length of the caps 15 and 24 located beneath them. In a preferred configuration of the fuse-receiving device, the fixed length of the caps 15 and 24 in the transverse direction to the web 1 is selected in such a way that, when the caps 54, 55 are lifted off, it is not possible to access the electrical buses located underneath, i.e. sufficient protection against accidental contact is ensured. The caps 54, 55 are provided with slots 61, 62 which extend in the longitudinal direction of the fastening web 1 and allow access to the lyre-shaped contacts located underneath.

To fit the holding member 5 on the fastening web 1, the holding member 5 is to be displaced, together with the transducer 6, in the direction of the arrow 68 in FIG. 3 in such a way that the contact tab 19 slides through the guide matrix 50 provided for the contact tab 19 and under the guide projections 52 until the holding member 5, via the fastening tabs 26 to 28 thereof, is brought into engagement with the fastening web 1 and the hole 40 in the contact tab 19 is aligned with the screw nut 36. The holding member 5 is held on the fastening web 1 by screwing in the stud bolt 42.

In the final, assembled state according to FIG. 1, the end face of the holding member 5 is positioned, via the base plate 25 thereof, against the fastening web 1 in such a way that the downward-facing base of the holding member 5 corresponds to the lower edge of the fastening web 1, i.e. the two parts lie in a plane and the holding member 5, as a separate member, is rigidly connected to the fastening web 1.

Figure 5:
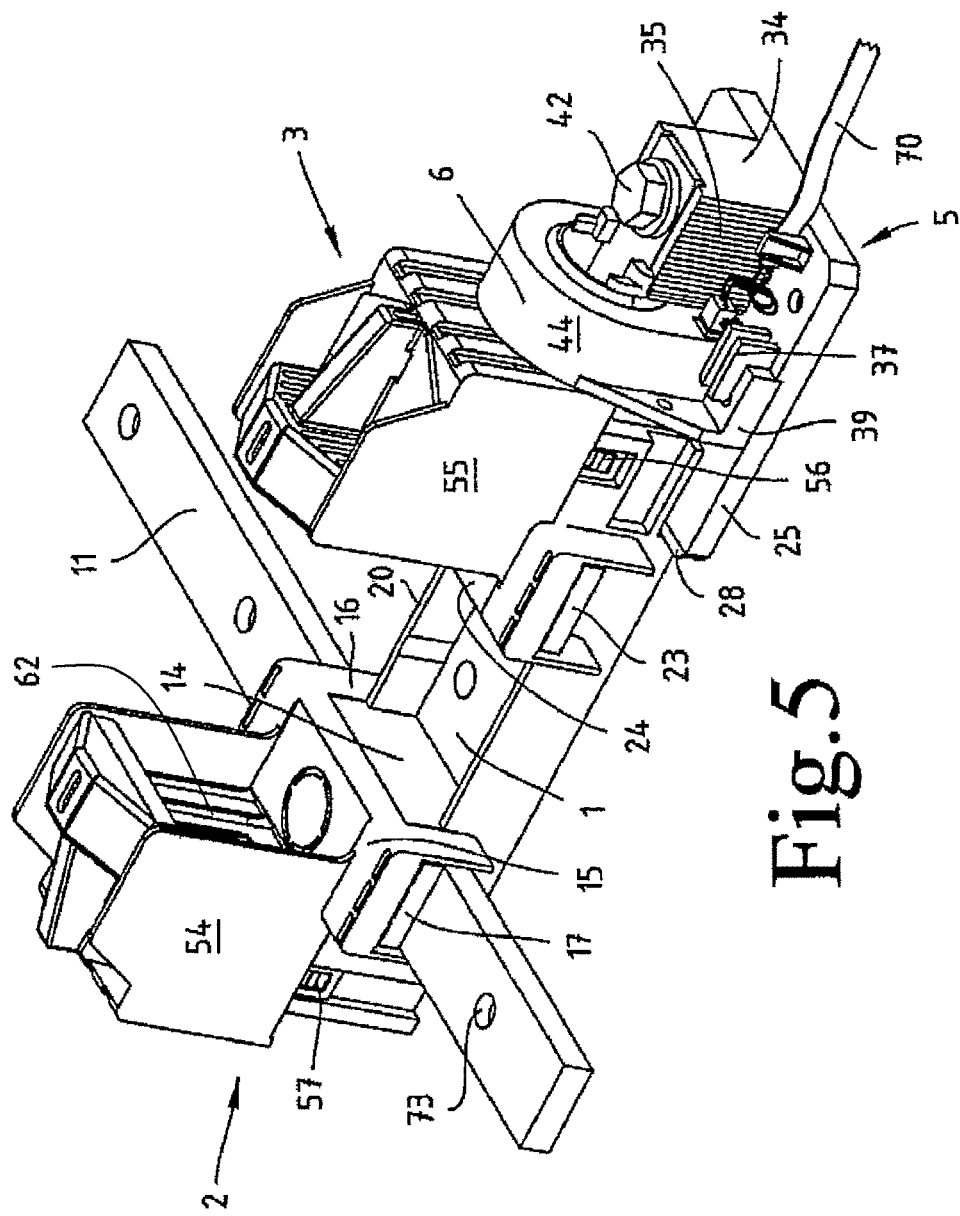
FIG. 5: is a perspective view, rotated through 180° in comparison to FIG. 1, of the fuse-receiving device.

FIG. 5 is a perspective view of the fuse-receiving device according to the invention comprising the fastening web 1, the electrical busbar 11, the caps 54, 55 with the slot openings 61, 62, the transducer 6 and a cable connection, denoted by reference numeral 70, on the output side of the transducer 6. The cable connection 70 is directly connected to the transducer 6 and, as explained above, supplies the current value detected to a measurement station. According to FIG. 5, the transducer 6 is retained on the plate 25 by L-shaped stops 37. In FIG. 5, the caps 64, 65, which may additionally cover the slot openings 61, 62 after the fuse has been inserted, have been removed.

The fuse-receiving device according to the invention is preferably used as a fuse base for NH fuses comprising an incoming and outgoing contact and a holding member 5 for receiving a transducer 6, which is rigidly arranged on the input side of the fuse-receiving device for measuring the current. On the outgoing side, the fuse-receiving device according to the invention is provided with an electrical busbar 11 which collects all the individual currents from the upstream electric power generators and feeds them via a line to an inverter. According to FIG. 2, the contact tab 19 is not only guided through the transducer 6, but is also electrically connected to the receiving contact portion 9 which leads to a terminal of the fuse to be inserted.

Although the embodiment shown only makes provision for connecting a cable lug on the incoming side, it is also possible for a cable lug connection to be provided on the other side of the fuse-receiving device instead of the electrical busbar 11.

If an electrical busbar 11 is used in the fuse-receiving device according to the invention as shown in FIGS. 1 and 2, the electrical busbar is located internally and is covered in the region of the fuse-receiving device by covers to prevent accidental contact.

The drawings also indicate that the contact tab 13 extends in an approximate Z-shape from the electrical busbar 11 to the contact portion 8. in the region of the electrical busbar 11 the portion of the contact tab 13 located below the electrical busbar 11 is, in a preferred embodiment, provided with an opening or hole, as a result of which it is necessary, in order to fasten the electrical busbar 11, to screw a stud bolt 72 (FIG. 2) through the electrical busbar 11 so as to screw the stud bolt 72 into a nut located underneath the fastening web 1. For this purpose the electrical busbar 11 has a plurality of through-holes 73, as shown in FIG. 5.

With the exception of the contact portions and contact tabs, etc., the fuse-receiving device according to the invention consists of an insulating material, preferably plastics material. The contact portions and contact tabs are locked or screwed against the base member of the fuse-receiving device. The holding member 5 also preferably consists of plastics material.

As can be seen in FIG. 1, the insulating caps 15, 24 provided as protection against accidental contact have a substantially U-shaped profile and are provided at the end faces thereof with the feet 15a, 15b which are at such a distance from one another that they overlap the fastening web 1 and come into contact laterally with the fastening web 1, and they can preferably engage in a locking manner with the outer faces of the fastening web 1. The fastening webs 17, which are preferably provided on either side of each cap 15, 24 and are aligned with the outer faces of the feet 16, therefore extend transversely to each U-shaped cap 15, 24.

The length of the caps 15 in the transverse direction may of course be selected to be longer than shown in FIG. 1 to increase the protection against accidental contact even further.

The invention claimed is:

1. A fuse-receiving device, in particular for junction boxes in photovoltaic systems, comprising a fastening web and receiving contact portions, arranged on end faces of said fastening web, for contact blades of fuses, comprising insulating caps which are placed on said fastening web and cover said receiving contact portions at least in part and also have slot openings allowing contact blades of a fuse to be guided through, wherein said fastening web has at least one groove-shaped socket for an electrical busbar, into which socket a contact tab of one of the receiving contact portions is inserted,
   wherein at least one groove extending along the axis of the fastening web is provided in at least one end face of said fastening web, and
   wherein a holding member is provided which has plug means which can be brought into engagement with said at least one groove;
   wherein cover caps, which have a length selected to be greater than the width of the fastening web, are provided on the fastening web at least in the region of the groove-shaped socket.

2. The fuse-receiving device according to claim 1, wherein said plug means is formed by tabs projecting away from the holding member.

3. The fuse-receiving device according to claim 2, wherein when engaged with the fastening web said holding member is arranged substantially in the plane of the fastening web.

4. The fuse-receiving device according to claim 1, wherein a further contact tab which projects beyond the fastening web is provided on the side of the fastening web facing the holding member.

5. The fuse-receiving device according to claim 4, wherein said further contact tab projecting from the fastening web has an opening.

6. The fuse-receiving device according to claim 4, wherein said contact tab projecting from the fastening web is arranged so as to be substantially perpendicular and at a distance from the plane of said electrical busbar and is electrically connected to one of the receiving contact portions.

7. The fuse-receiving device according to claim 1, wherein said holding member is provided with a fastening means for receiving screw means or the like.

8. The fuse-receiving device according to claim 7, wherein said holding member has, as a fastening means, a nut which is inserted into a fastening block and is used to receive screw means which are guided through said opening in the contact tab.

9. The fuse-receiving device according to claim 8, wherein said holding member has further fastening means.

10. The fuse-receiving device according to claim 9, wherein a component, preferably a transducer, is arranged on the holding member and is secured relative to a base plate of the holding member by the further fastening means.

11. The fuse-receiving device according to claim 1, wherein the fastening web is provided with a plug socket formed to receive said plug means.

12. The fuse-receiving device according to claim 1, wherein the groove shaped socket for receiving the electrical busbar is oriented transversely to the longitudinal axis of the fastening web.

13. The fuse-receiving device according to claim 1, wherein the contact tab inserted into the groove is approximately Z-shaped and is electrically connected to both a contact portion and the electrical busbar.

14. The fuse-receiving device according to claim 1, wherein insulating caps which cover the receiving contact portions have a width approximately equal to the width of the fastening web.

15. The fuse-receiving device according to claim 1, wherein said cover caps which are provided as protection against contact and cover the electrical busbar are provided with at least one removable compensating web.

* * * * *